(12) United States Patent
Kim et al.

(10) Patent No.: US 12,489,172 B2
(45) Date of Patent: Dec. 2, 2025

(54) BATTERY MODULE

(71) Applicant: Samsung SDI Co., Ltd., Yongin-si (KR)

(72) Inventors: Jae Min Kim, Yongin-si (KR); Young Hyun Choi, Yongin-si (KR); Jun Hee Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 137 days.

(21) Appl. No.: 18/491,715

(22) Filed: Oct. 20, 2023

(65) Prior Publication Data
US 2024/0339715 A1    Oct. 10, 2024

(30) Foreign Application Priority Data
Apr. 4, 2023    (KR) .................. 10-2023-0044181

(51) Int. Cl.
*H01M 50/342* (2021.01)
*H01M 50/209* (2021.01)

(52) U.S. Cl.
CPC ..... *H01M 50/3425* (2021.01); *H01M 50/209* (2021.01); *H01M 2200/20* (2013.01)

(58) Field of Classification Search
None
See application file for complete search history.

(56) References Cited

U.S. PATENT DOCUMENTS

| | | |
|---|---|---|
| 9,466,819 B2 | 10/2016 | Lim |
| 11,145,933 B2 | 10/2021 | Kim et al. |
| 2013/0236754 A1 | 9/2013 | Lim |
| 2015/0162578 A1* | 6/2015 | Kim ............ H01M 50/507 429/82 |
| 2015/0214583 A1* | 7/2015 | Lim ............ H01M 10/486 429/90 |
| 2016/0226036 A1* | 8/2016 | Kim ............ H01M 50/224 |
| 2017/0110698 A1* | 4/2017 | Kim ............ H01M 50/509 |
| 2017/0125753 A1* | 5/2017 | Kim ............ H01M 50/289 |
| 2017/0125770 A1* | 5/2017 | Kim ............ H01M 50/507 |
| 2017/0141365 A1* | 5/2017 | Kim ............ H01M 50/509 |
| 2017/0141367 A1* | 5/2017 | Kim ............ H01M 50/262 |
| 2018/0190956 A1 | 7/2018 | Lica et al. |

(Continued)

FOREIGN PATENT DOCUMENTS

| | | | | |
|---|---|---|---|---|
| JP | 2022007852 A | * | 1/2022 | ......... H01M 50/159 |
| KR | 2009110710 A | * | 10/2009 | ........ H01M 10/0587 |

(Continued)

OTHER PUBLICATIONS

WO-2021196169-A1 English machine translation (Year: 2021).*
Extended European Search Report issued in corresponding EP Application No. 24160536.9, dated Aug. 7, 2024, 7 pages.

*Primary Examiner* — Scott J. Chmielecki
(74) *Attorney, Agent, or Firm* — Womble Bond Dickinson (US) LLP

(57) ABSTRACT

A battery module includes: a battery cell having a cell vent; and a bus bar holder on the battery cell and having a module vent. The module vent having a flat first surface, a flat second surface opposite to the first surface and facing the battery cell, a vent hole extending between the first and second surfaces and facing the cell vent, and a plurality of bending guide grooves in a partial region of the first surface spaced apart from the vent hole.

15 Claims, 9 Drawing Sheets

(56) References Cited

U.S. PATENT DOCUMENTS

| | | | | |
|---|---|---|---|---|
| 2020/0303701 A1* | 9/2020 | Kim | ................ | H01M 50/3425 |
| 2020/0350530 A1* | 11/2020 | Kim | .................. | H01M 10/613 |
| 2021/0074974 A1* | 3/2021 | Kim | .................. | H01M 50/209 |
| 2022/0021068 A1 | 1/2022 | Zeng et al. | | |

FOREIGN PATENT DOCUMENTS

| | | | | | |
|---|---|---|---|---|---|
| KR | 10-1678530 B1 | 9/2013 | | | |
| KR | 10-2152886 B1 | 6/2019 | | | |
| KR | 2019069131 A | * | 6/2019 | ........ | H01M 10/0486 |
| KR | 10-2021-0029131 A | | 3/2021 | | |
| WO | WO-2021196169 A1 | * | 10/2021 | .......... | H01M 50/578 |

* cited by examiner

BATTERY MODULE

CROSS-REFERENCE TO RELATED APPLICATION

The present application claims priority to and the benefit of Korean Patent Application No. 10-2023-0044181, filed on Apr. 4, 2023, in the Korean Intellectual Property Office, the entire disclosure of which is incorporated herein by reference.

BACKGROUND

1. Field

Aspects of embodiments of the present disclosure relate to a battery module.

2. Description of the Related Art

Generally, a battery module is a battery assembly including a number of bundled together battery cells that are placed in a frame to protect the battery cells from external shock, heat, vibration, etc. A battery module includes a number of battery cells connected to each other in series and/or parallel and embedded in a mechanical structure.

Although commonly referred to as a "battery", a battery may refer to a "cell", a "module", and a "pack". A cell (e.g., a battery cell) stores and releases energy, but the capacity of each cell is relatively small. Thus, a number of battery cells are bundled together to form a module, and modules are further combined to form a pack. The energy source of a battery is the cells, and these cells are bundled in the order of module and pack units.

When an event occurs in a cell of a module, a safety vent (also referred to as a cell vent) of the cell may open (e.g., may burst) and vent gas may be discharged. In this case, the vent gas may be rapidly discharged to the outside of the module to delay heat propagation between the cells. However, in the related art, a bus bar holder positioned on an upper portion (or upper surface) of the cell does not have a vent hole (or opening), or even if there is, the size of the vent hole is quite small. Thus, the vent gas may not be quickly discharged to the outside of the module, which is problematic.

Moreover, in recent years, as the cell capacity (e.g., energy capacity) increases, the size of a cell vent is also increasing. However, there is a limit to the size of the vent hole because there must be a mounting space for various components (e.g., a printed circuit board, a sensor, an electric/electronic component, etc.) on the bus bar holder.

The above information disclosed in this Background section is for enhancement of understanding of the background of the present disclosure, and therefore, it may contain information that does not constitute related (or prior) art.

SUMMARY

Embodiments of the present disclosure provide a battery module in which, although the size of a vent hole in a bus bar holder is relatively small before an event occurs in a cell, when an event occurs in a cell, the size of the vent hole increases to be the same or similar level as the size of a cell vent because some regions of the vent hole are removed due to the high temperature and pressure of vent gas and the remaining regions are widened in the direction of gas discharge due to high pressure during gas discharge. Thus, the vent gas is discharged quickly, thereby securing a component mounting space and delaying heat propagation between adjacent cells.

A battery module, according to an embodiment of the present disclosure, includes: a battery cell having a cell vent; and a bus bar holder on the battery cell and having a module vent. The module vent has a flat first surface, a flat second surface opposite to the first surface and facing the battery cell, a vent hole extending between the first and second surfaces and facing the cell vent, and a plurality of bending guide grooves in a partial region of the first surface spaced apart from the vent hole. A size of the vent hole may be smaller than a size of the cell vent.

The plurality of bending guide grooves may form a square line shape in which the respective sides are spaced apart from each other.

The module vent may have a plurality of rupture guide grooves in a partial region of the second surface.

The rupture guide grooves may radially extend along a diagonal direction with respect to the vent hole.

The bending guide grooves and the rupture guide grooves may not overlap each other.

The module vent may satisfy the following equation:

$$0.01 \text{ mm} \leq T1 \leq 0.5 \text{ mm}$$

wherein T1 is a depth of the rupture guide grooves.

The module vent may satisfy the following equations:

$$L2 \geq L1 \times 1/2 \text{ and } W2 \geq W1 \times 1/2$$

wherein L1 is a length of the cell vent, L2 is a length of the vent hole, W1 is a width of the cell vent, and W2 is a width of the vent hole.

The module vent may satisfy the following equation:

$$2.5 \leq L2/W2 \leq 2.8$$

wherein L2 is a length of the vent hole, and W2 is a width of the vent hole.

The module vent may satisfy the following equations:

$$L3 \leq L1 \text{ and } W3 \leq W1$$

wherein L1 is a length of the cell vent, L3 is a distance between major axes of the bending guide grooves, W1 is a width of the cell vent, and W3 is a distance between minor axes of the bending guide grooves.

The module vent may satisfy the following equation:

$$T3 \times 1/2 \leq T2 \leq T3 \times 3/4$$

wherein T2 is a thickness between a bottom of the bending guide grooves and the second surface, and T3 is a thickness between the first surface and the second surface.

A battery module, including to an embodiment of the present disclosure, includes: a battery cell having a cell vent; and a bus bar holder on the battery cell and having a module vent. The module vent has a flat first surface, a flat second surface opposite to the first surface facing the battery cell, a vent hole extending between the first and second surfaces and facing the cell vent, and a plurality of rupture guide grooves in a partial region of the second surface.

The rupture guide grooves may be radially arranged around the vent hole and may extend in diagonal directions with respect to the vent hole.

The module vent may have a plurality of bending guide grooves in a partial region of the first surface spaced apart from the vent hole.

The plurality of bending guide grooves may form a square line shape in which the respective sides are spaced apart from each other.

DETAILED DESCRIPTION

Figure 1A:
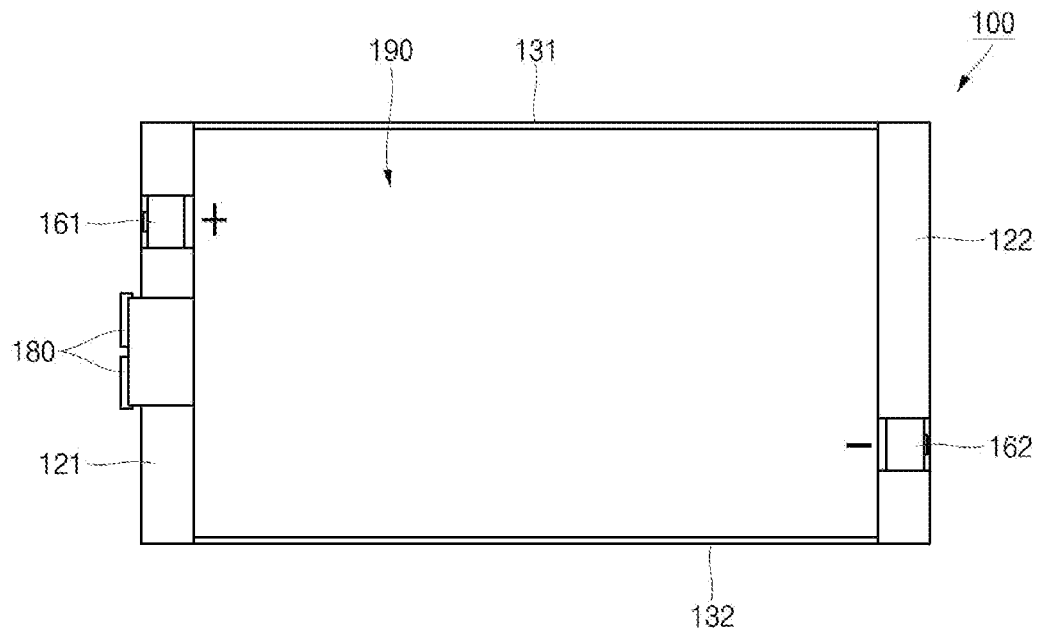
FIG. 1A is a top view of a battery module according to an embodiment of the present disclosure.

Hereinafter, embodiments of the present disclosure will be described, in detail, with reference to the accompanying drawings. These embodiments of the present disclosure are provided to more fully describe the present disclosure to those skilled in the art, and the following embodiments may be embodied in many different forms. The present disclosure should not be construed as being limited to the embodiments described herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 1B:
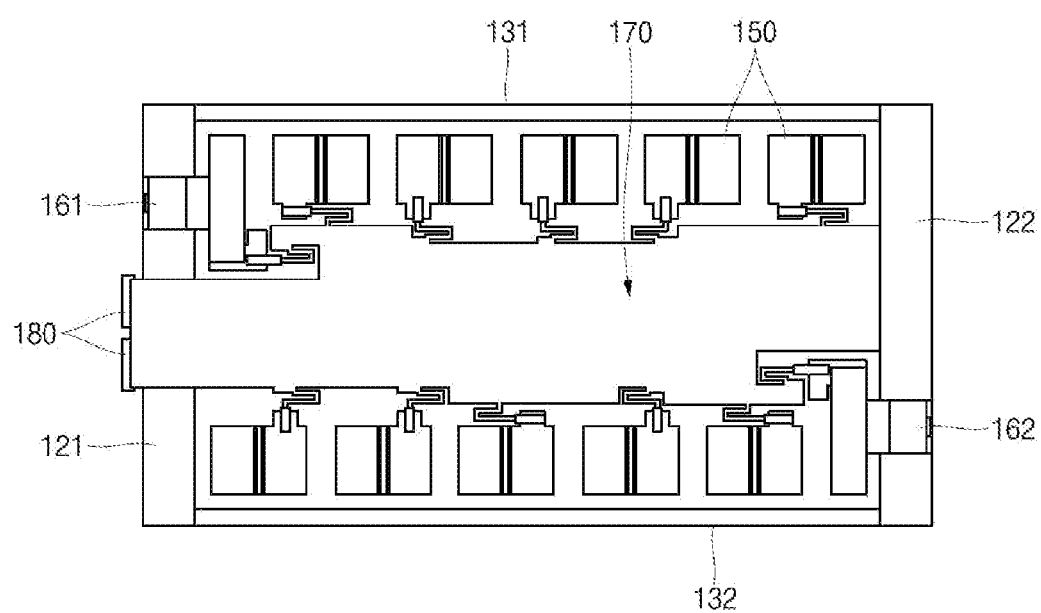
FIG. 1B is a top view of the battery module shown in FIG. 1A with a top cover removed.
Figure 1C:
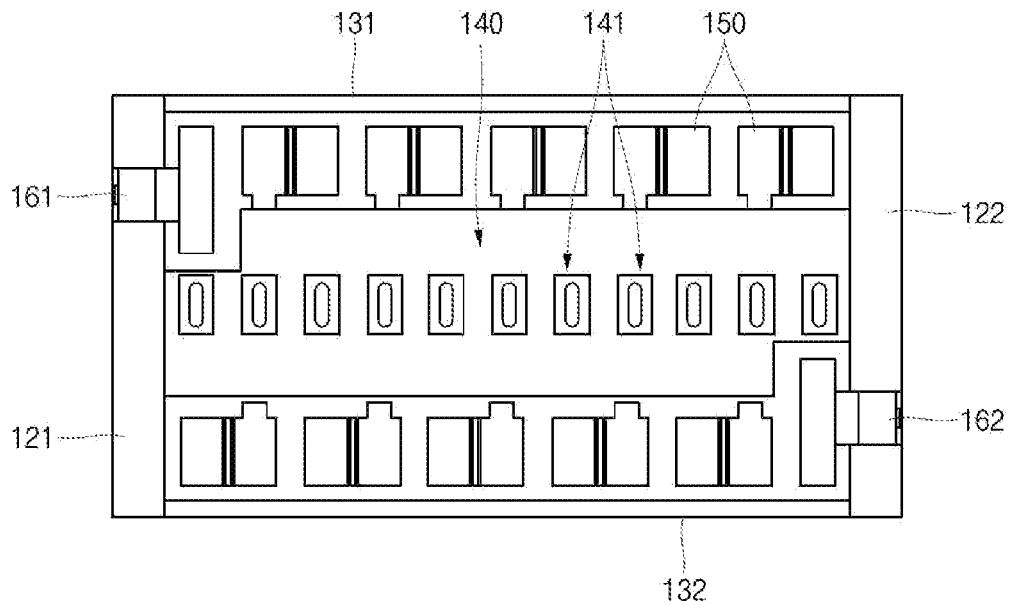
FIG. 1C is a top view of the battery module shown in FIG. 1B with a circuit board removed.
Figure 1D:
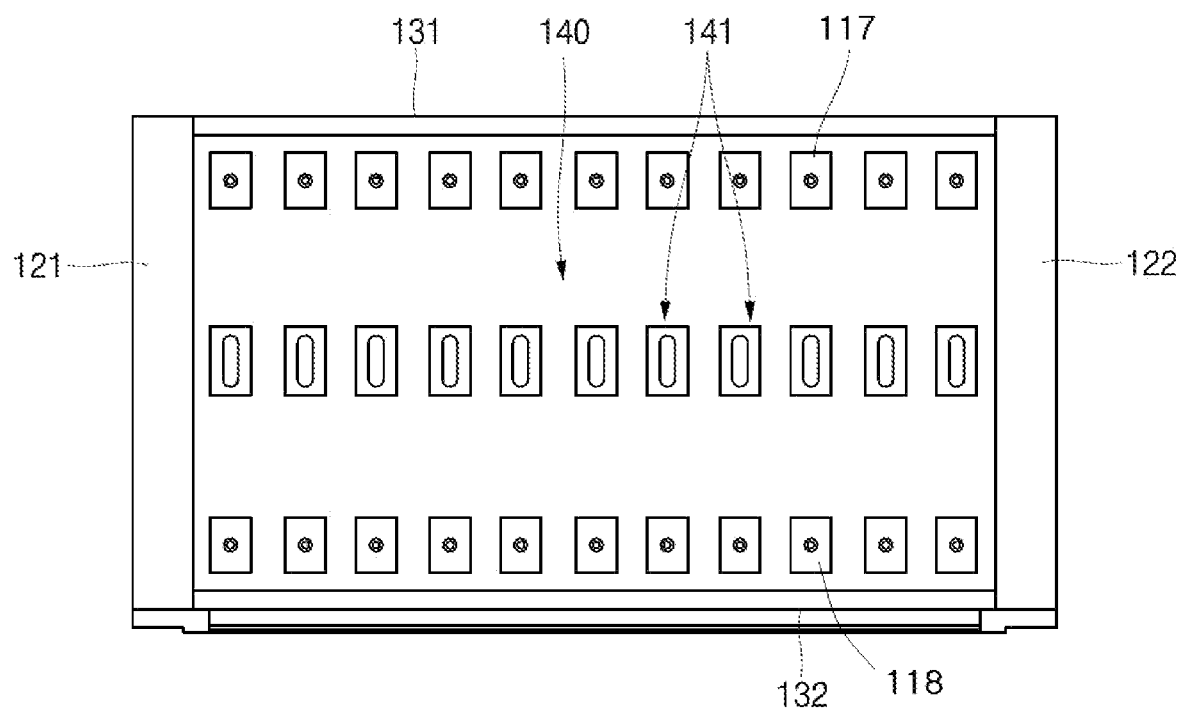
FIG. 1D is a top view of the battery module shown in FIG. 1C with a bus bar removed.
Figure 1E:
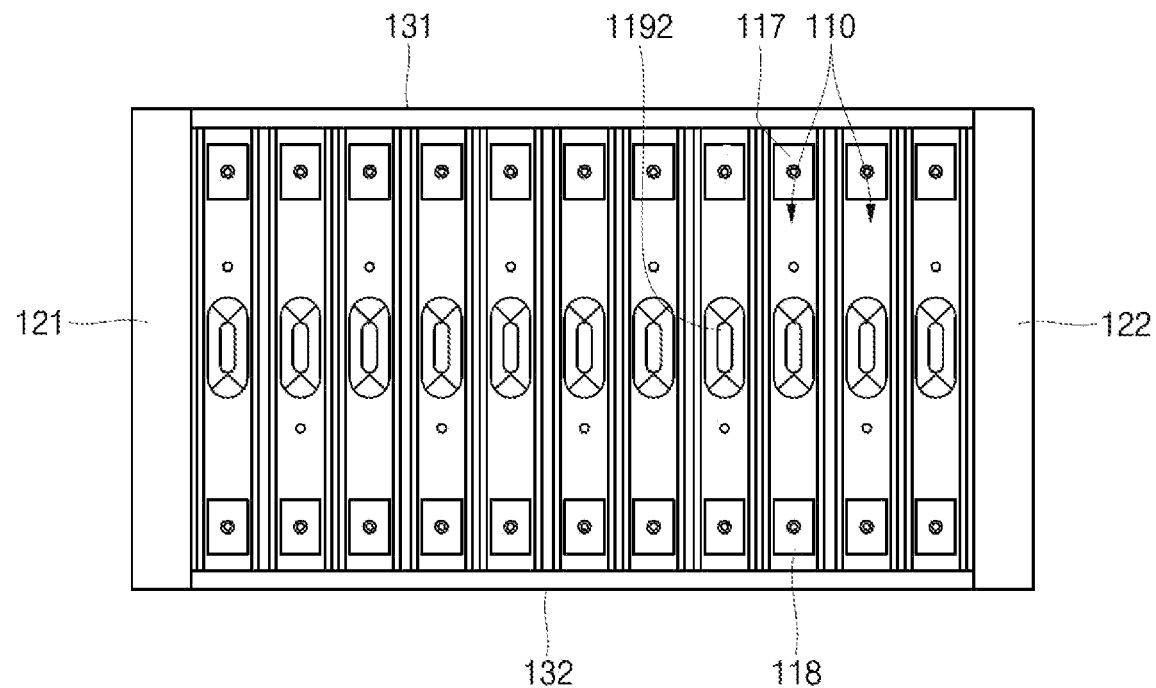
FIG. 1E is a top view of the battery module shown in FIG. 1D with a bus bar holder removed.

FIG. 1A is a top view of a battery module 100 according to an embodiment of the present disclosure, FIG. 1B is a top view of the battery module 100 shown in FIG. 1A with a top cover 190 removed, FIG. 1C is a top view of the battery module 100 shown in FIG. 1B with a circuit board 170 removed, FIG. 1D is a top view of the battery module 100 shown in FIG. 1C with bus bars 150 removed, and FIG. 1E is a top view of the battery module 100 shown in FIG. 1D with a bus bar holder 140 removed.

Referring to FIGS. 1A to 1E, the battery module 100 (also referred to herein as the module) according to an embodiment of the present disclosure may include a plurality of battery cells 110 (also referred to herein as cells) arranged in a row, a pair of end plates 121 and 122 coupled to both ends of the plurality of battery cells 110 in the longitudinal direction, a pair of side plates 131 and 132 coupled to both ends of the plurality of battery cells 110 in the width direction, a bus bar holder 140 covering the plurality of battery cells 110, a plurality of bus bars 150 electrically connecting the plurality of battery cells 110 on the bus bar holder 140, a positive electrode output terminal 161 connected to one side bus bar 150 and extending to the outside of the module, a negative electrode output terminal 162 connected to the other bus bar 150 and extending to the outside of the module, a circuit board 170 electrically connected to the plurality of bus bars 150 on the bus bar holder 140, a connector 180 connected to one side of the circuit board 170 and extending to the outside of the module, and a top cover 190 covering the bus bars 150 and the circuit board 170.

The battery module 100 may further include a bottom plate positioned on the opposite side of the top cover 190 and covering the plurality of battery cells 110, and the bottom plate may be coupled to the pair of side plates 131 and 132 and/or the pair of end plates 121 and 122.

In some embodiments, an insulator may be interposed between adjacent ones of the battery cells 110 to delay heat propagation between the cells 110.

In some embodiments, each battery cell 110 may include a cell vent 1192 (see, e.g., FIG. 2), and the bus bar holder 140 may include a plurality of module vents 141.

In some embodiments, the cell vents 1192 may be respectively positioned below (e.g., may be vertically aligned with) the module vents 141.

In some embodiments, the bus bar holder 140 may be an insulator and may be made of, for example, a plastic resin.

Figure 2:
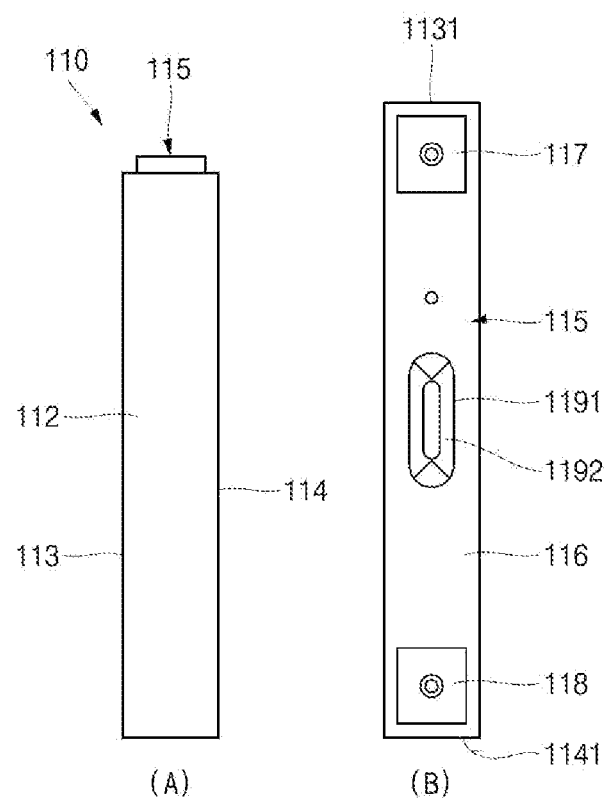
FIG. 2 shows side and top surfaces of a battery cell according to an embodiment of the present disclosure.

FIG. 2 shows side and top surfaces of the battery cell 110 according to an embodiment of the present disclosure.

Referring to FIG. 2, the battery cell 110 may include a case 112 for accommodating an electrode assembly. The case 112 may contain (e.g., may accommodate or house) an electrolyte (e.g., a liquid, gel, or solid electrolyte). In addition, the battery cell 110 may include a cap assembly 115 sealing an opening in case 112. The battery cell 110 will be described as a lithium ion secondary battery having a prismatic shape as a non-limiting example.

The electrode assembly may be provided as a jelly roll type electrode assembly in which positive and negative electrodes are wound with a separator interposed therebetween or as a stack type in which positive and negative electrodes are stacked with a separator interposed therebetween. Each of the positive electrode and the negative electrode may include a current collector provided as a thin metal foil having a coating region on which an active material may be coated and a non-coating region on which an active material is not coated. As a non-limiting example, the coating region of the positive electrode may be provided by coating an active material, such as a transition metal oxide, on a substrate provided as a metal foil, such as aluminum foil. In addition, the coating region of the negative electrode may be provided by coating an active material, such as carbon, graphite, etc., on a substrate provided as a metal foil, such as copper or nickel foil.

A positive electrode non-coating region may be provided at one end of the positive electrode in the longitudinal direction of the positive electrode, and a negative electrode non-coating region may be provided at one end of the negative electrode in the longitudinal direction of the negative electrode. The positive electrode non-coating region and the negative electrode non-coating region may be at opposite sides of the coating regions (e.g., may protrude from opposite sides of the electrode assembly). In addition, a separator may include a plurality of separators, and the positive electrode, the negative electrode, and the separator may be wound after the positive electrode, the negative electrode, and the separator are alternately positioned (e.g., are alternately stacked).

The electrode assembly may be accommodated in the case 112 together with an electrolyte. The electrolyte may be formed of a lithium salt, such as $LiPF_6$ or $LiBF_4$, with an organic solvent, such as ethylene carbonate (EC), propylene carbonate (PC), diethyl carbonate (DEC), ethyl methyl carbonate (EMC), or dimethyl carbonate (DMC). The case 112 may have a substantially rectangular parallelepiped shape with an opening provided on one surface. The case 112 may be formed from a metal, such as aluminum or stainless steel.

The case 112 may have a substantially rectangular bottom surface and may include a pair of first sidewalls 113 and 114, which are wide sides, and a pair of second sidewalls 1131 and 1141 vertically connected to (e.g., vertically extending from) ends of the bottom surface to provide an accommodation space for the electrode assembly. The first sidewalls 113 and 114 may face each other, and the second sidewalls 1131 and 1141 may be positioned to face each other and may be connected to the first sidewalls 113 and 114. An edge length of a side at where the bottom surface and the first sidewalls 113 and 114 are connected may be longer than a length of an edge at where the bottom surface and the second sidewalls 1131 and 1141 are connected. A rounded region may be provided between adjacent first and second sidewalls.

The cap assembly 115 may include a cap plate 116 coupled to the case 112 and covering (e.g., sealing) an opening in the case 112. A positive electrode terminal 117 (e.g., a first terminal) and a negative electrode terminal 118 (e.g., a second terminal) protrude outwardly from the cap plate 116 and are electrically connected to the positive electrode and the negative electrode, respectively. The cap plate 116 may have a plate shape extending in one direction and may be coupled at an opening in the case 112. The cap plate 116 may have a vent hole 1191 communicating with (e.g., in fluid communication with) the inside of the cap assembly 115 (e.g., with the inside of the case 112). In addition, a cell vent 1192, including a notch to facilitate opening (e.g., bursting) at a certain pressure may be mounted in the vent hole 1191 or on the vent hole 1191.

The positive electrode terminal 117 and the negative electrode terminal 118 may be mounted to protrude upwardly from the cap plate 116. The positive electrode terminal 117 may be electrically connected to the positive electrode through a current collecting tab, and the negative electrode terminal 118 may be electrically connected to the negative electrode through a current collecting tab. A terminal connecting member for electrically connecting the positive electrode terminal 117 and the current collecting tab may be mounted between the positive electrode terminal 117 and the current collecting tab. The terminal connecting member may be inserted into a hole (e.g., an opening) provided at the positive electrode terminal 117, and a lower portion thereof may be welded to the current collecting tab.

Figure 3:
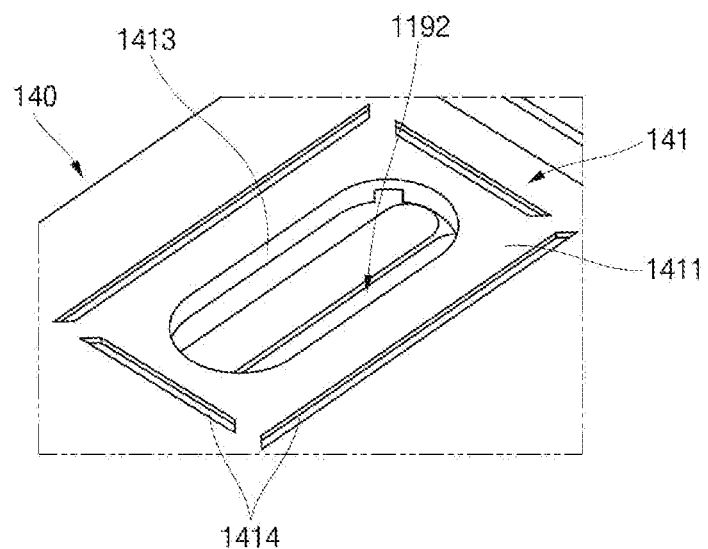
FIG. 3 is a perspective view of a module vent of a bus bar holder according to an embodiment of the present disclosure.

FIG. 3 is a perspective view of the module vent 141 of the bus bar holder 140 according to an embodiment of the present disclosure.

Figure 5A:
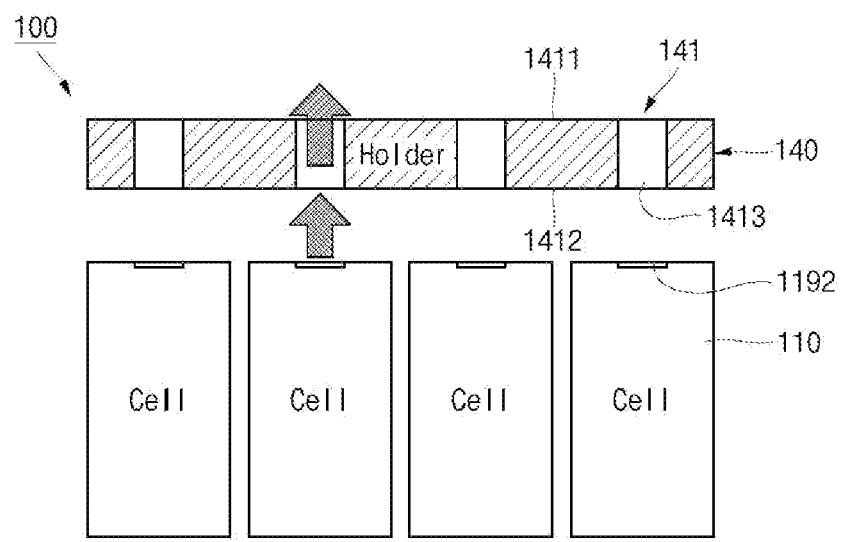
FIG. 5A shows a gas discharge path through a module vent in a bus bar holder.

Referring to FIG. 3, the module vent 141 may have a flat first surface 1411 and a flat second surface 1412 opposite to the first surface 1411 and facing the battery cell 110 (see, e.g., FIG. 5A). In addition, the module vent 141 may have a vent hole 1413 passing through (e.g., extending between) the first and second surfaces 1411 and 1412 and facing the cell vent 1192 of the battery cell 110. In addition, the module vent 141 may have a plurality of bending guide grooves 1414 provided in a partial region of the first surface 1411 and spaced apart from the vent hole 1413. In some embodiments, the module vent 141 may further include a plurality of rupture guide grooves 1415 (see, e.g., FIG. 6B) provided in a portion of the second surface 1412 and spaced apart from the vent hole 1413.

Figure 4:
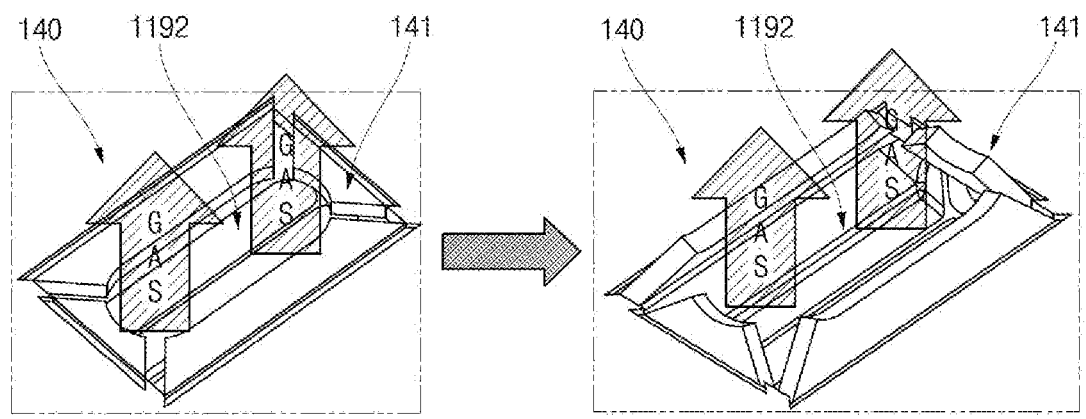
FIG. 4 is a diagram illustrating operation of the module vent shown in FIG. 3 according to an embodiment of the present disclosure.

FIG. 4 is a diagram illustrating operation of the module vent 141 in the battery module 100 according to an embodiment of the present disclosure.

Referring to FIG. 4, when an event occurs in the battery cell 110, the cell vent 1192 opens (e.g., bursts) and high-temperature and high-pressure gas may be discharged to the outside. In some cases, the hot high-pressure gas may first melt and fracture the rupture guide grooves 1415 in the module vent 141 (see, e.g., FIG. 6B).

Figure 6A:
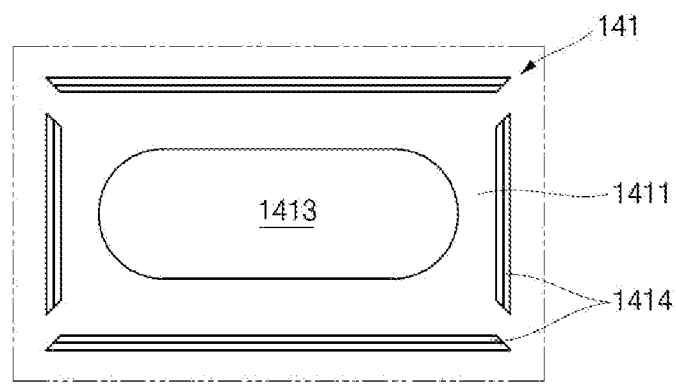
FIGS. 6A and 6B are top and bottom views of a module vent according to an embodiment of the present disclosure.

In some embodiments, the high-temperature, high-pressure gas then causes the module vent 141 to bend or open in an upward direction on the basis of (e.g., along) the bending guide grooves 1414 in the module vent 141 (see, e.g., FIG. 6A).

In some embodiments, when the battery cell 110 is in a normal state, the size of the module vent 141 may be smaller than the size of the cell vent 1192, but when the battery cell 110 is experiencing an event, the size of the module vent 141 may enlarge to be the same as or similar to the size of the cell vent 1192.

During a cell event, the size of the module vent 141 increases as described herein so that internal gas of the battery cell 110 can be quickly discharged through the bus bar holder 140. Thus, heat propagation between the battery cells 110 can be reduced or delayed. Accordingly, thermal runaway of the battery module 100 may be prevented. In addition, when the battery cell 110 is in a normal state, the size of the module vent 141 is smaller than the size of the cell vent 1192, thereby allowing various components to be mounted on the bus bar holder 140.

Figure 5B:
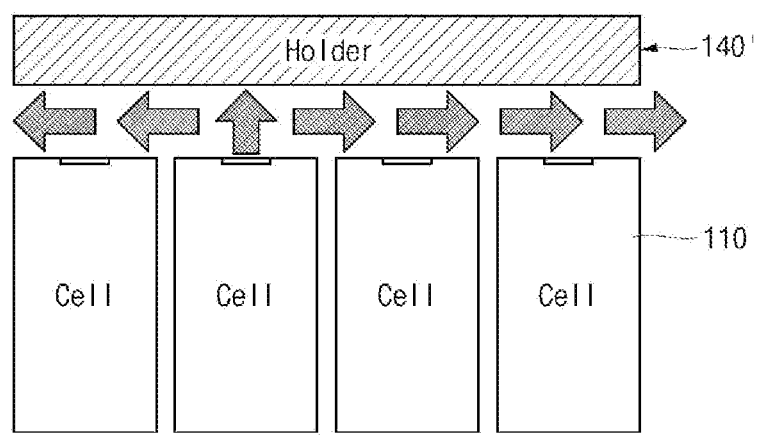
FIG. 5B shows a gas discharge path when a module vent is not provided in a bus bar holder.

FIG. 5A shows a gas discharge path when the bus bar holder 140 has the module vents 141 according to an embodiment of the present disclosure, and FIG. 5B shows a gas discharge path when a bus bar holder 140' does not have module vents according to a comparative example.

Referring to FIG. 5A, the module vent 141 may include a substantially flat first surface 1411, a substantially flat second surface 1412 opposite to the first surface 1411 and facing the battery cell 110, and a vent hole 1413 passing through the first and second surfaces 1411 and 1412 and facing the cell vent 1192. Accordingly, when an event occurs in the battery cell 110, cell gas may be quickly discharged to the outside through the vent hole 1413.

However, referring to FIG. 5B, when a vent hole is not provided in a bus bar holder 140', high-temperature and high-pressure gas from the battery cell 110 experiencing the event may be transferred to (e.g., may be incident on) another adjacent battery cell 110, and as a result, a thermal runaway phenomenon may occur in the battery module 100.

Figure 6B:
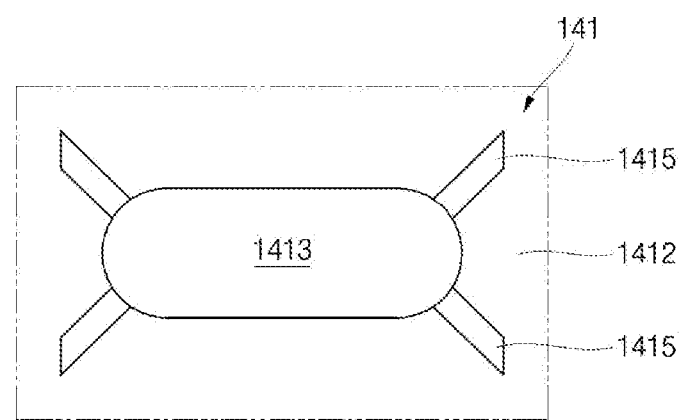

FIGS. 6A and 6B are top and bottom views of a module vent 141 according to an embodiment of the present disclosure.

As shown in FIG. 6A, the module vent 141 may have a vent hole 1413 passing through the first surface 1411 and the second surface 1412 to face the cell vent 1192 and a plurality of bending guide grooves 1414 provided in a partial region of the first surface 1411 and spaced apart from the vent hole 1413.

In some embodiments, the planar shape of the vent hole 1413 may be approximately elliptical. In some embodiments, the size of the vent hole 1413 may be smaller than the size of the cell vent 1192. In some embodiments, the plurality of bending guide grooves 1414 may form a square line shape in which the respective sides are spaced apart from each other. In some embodiments, the plurality of bending guide grooves 1414 may form a square line shape in which the respective sides are connected to each other. Accordingly, when the cell vent 1192 opens, the inner region of module vent 141 thereof may be bent on the basis of the plurality of bending guide grooves 1414 in the gas discharge direction.

As shown in FIG. 6B, the module vent 141 may include a plurality of rupture guide grooves 1415 provided in a partial region of the second surface 1412 extending from the vent hole 1413.

In some embodiments, the rupture guide grooves 1415 may be radially disposed along a diagonal direction away from the vent hole 1413. Accordingly, the rupture guide grooves 1415 may be melted and ruptured by the high-temperature and high-pressure gas discharged when the cell vent 1192 opens so that the module vent 141 may be divided into multiple regions. In addition, as a result, due to the high-temperature and high-pressure gas, the module vent 141 may be bent and widened in a direction away from the battery cell 110, and eventually, the size of the module vent 141 may be the same as or similar to the size of the cell vent 1192.

In some embodiments, the module vent 141 may satisfy the equation below:

$$0.01 \text{ mm} \leq D1 \leq 0.5 \text{ mm}$$

where D1 is the depth of the rupture guide grooves 1415. In other words, D1 is the depth from the second surface 1412 to the top of the rupture guide grooves 1415. If the depth D1 of the rupture guide grooves 1415 is less than approximately 0.01 mm, the melting and rupture of the rupture guide grooves 1415 may be delayed or some regions may not be completely eliminated (or completely melted or torn) when the vent gas is released, and accordingly, the operation of the module vent 141 may be delayed. If the depth D1 of the rupture guide grooves 1415 is greater than about 0.5 mm, the strength of the module vent 141 is low, so that when various components are seated on the bus bar holder 140, the module vent 141 may be damaged.

In some embodiments, the bus bar holder 140 may include only the bending guide grooves 1414 or only the rupture guide grooves 1415. In some embodiments, the bus bar holder 140 may include both the bending guide grooves 1414 and rupture guide grooves 1415.

Figure 7A:
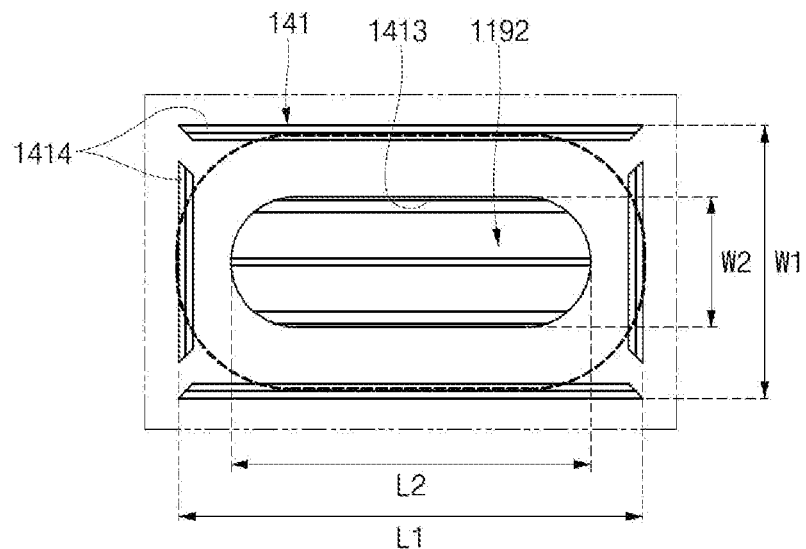
FIGS. 7A and 7B are diagrams showing a relationship between a cell vent and a module vent in a battery module according to an embodiment of the present disclosure.
Figure 7B:
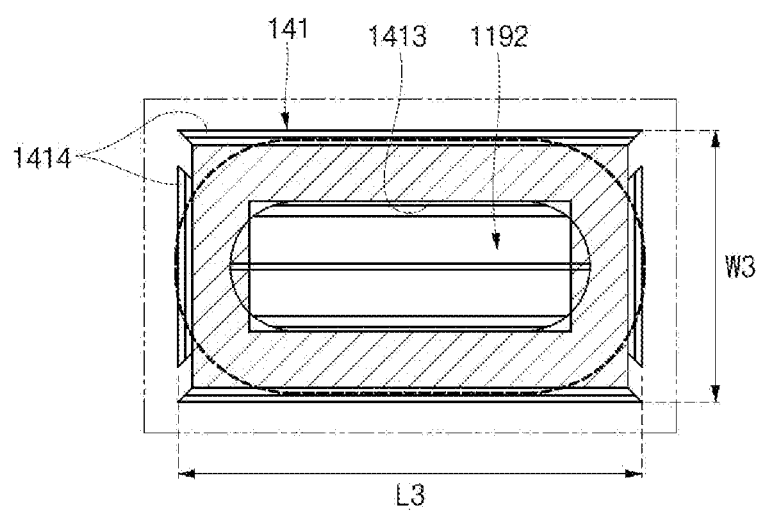

FIGS. 7A and 7B are diagrams explaining a relationship between a cell vent 1192 and a module vent 141 in the battery module 100 according to an embodiment of the present disclosure.

In FIGS. 7A and 7B, elliptical dotted lines indicate the size of the cell vent 1192. Embodiments of the present disclosure are configured such that, before an event occurs in the battery cell 110, the size of the module vent 141 of the bus bar holder 140 (e.g., the size of the vent hole 1413) is smaller than the size of the cell vent 1192, but, when an event occurs in the battery cell 110, the size of the module vent 141 (e.g., the size of the vent hole 1413) becomes the same as or similar to the size of the cell vent 1192. For example, in case the module vent 141 does not operate (e.g., does not burst), the module vent 141 is at least half the size of the cell vents 1192.

As an example, as shown in FIG. 7A, the module vent 141, according to an embodiment of the present disclosure, may be configured to satisfy the equations below:

$$L2 \geq L1 \times 1/2 \text{ and } W2 \geq W1 \times 1/2$$

where L1 is the length of the cell vent 1192, L2 is the length of the vent hole 1413, W1 is the width of the cell vent 1192, and W2 is the width of the vent hole 1413.

In addition, in case the module vent 141 does not operate, the module vent 141 is configured such that the ratio of the length to the width thereof is similar to that of the cell vent 1192.

As an example, as shown in FIG. 7A, the module vent 141, according to an embodiment of the present disclosure, may be configured to satisfy the equation below:

$$2.5 \leq L2/W2 \leq 2.8$$

where L2 is the length of the vent hole 1413, and W2 is the width of the vent hole 1413.

In the module vent 141, the distance between the bending guide grooves 1414 (e.g., the major axis distance and the minor axis distance) may be equal to or smaller than the distance of the cell vent 1192 (e.g., the major axis distance and the minor axis distance) so that, when an event occurs in the battery cell 110, sufficient force to open the module vent 141 in the upward direction may be received. In FIG. 7B, the shaded portion represents an area that spreads or opens in the upward direction during a cell event.

In some embodiments, the module vent 141 may be configured to satisfy the equations below:

$$L3 \leq L1 \text{ and } W3 \leq W1$$

where L1 is the length of the cell vent 1192, L3 is the distance between major axes of the bending guide grooves 1414, W1 is the width of the cell vent 1192, and W3 is the distance between the minor axes of the bending guide grooves 1414.

Figure 8A:
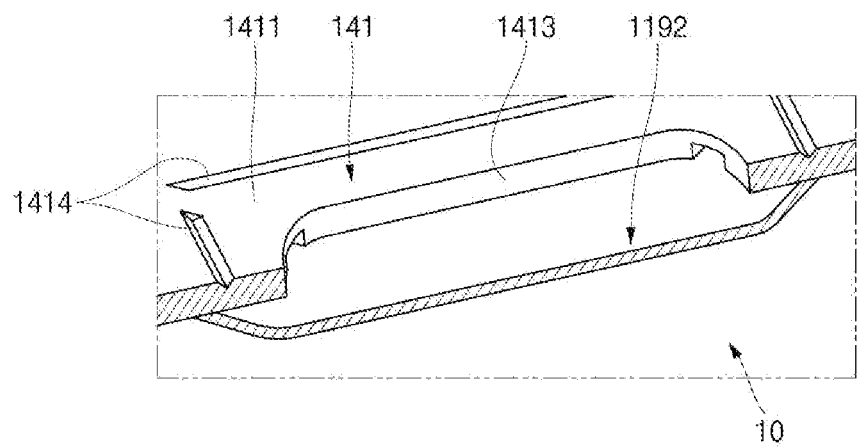
FIGS. 8A to 8C are views showing bending guide grooves of a module vent according to an embodiment of the present disclosure.
Figure 8B:
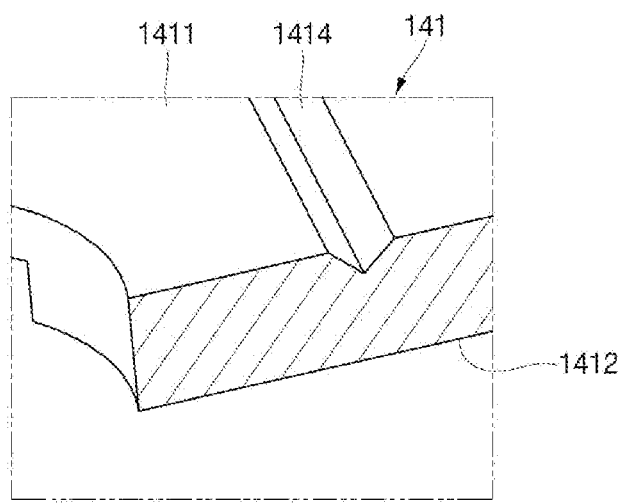
Figure 8C:
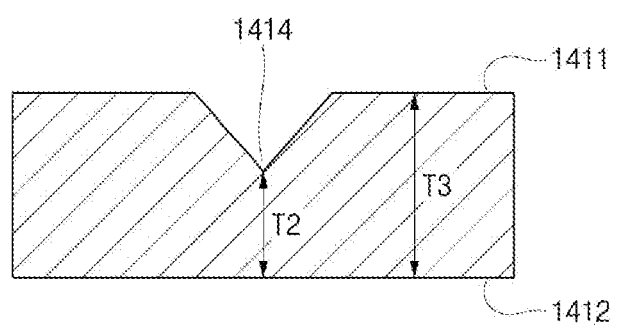

FIGS. 8A to 8C are views of bending guide grooves 1414 in a module vent 141 according to an embodiment of the present disclosure.

As shown in FIGS. 8A and 8B, bending guide grooves 1414 may be provided in the first surface 1411 of the module vent 141 so that the module vent 141 is bent in the direction of the gas flow discharged from the cell vent 1192. In some embodiments, the cross-sectional shape of the bending guide grooves 1414 may be approximately an inverted triangle shape.

Referring to FIG. 8C, in some embodiments, module vent 141 may be configured to satisfy the equation below.

$$T3 \times 1/2 \leq T2 \leq T3 \times 3/4$$

where T2 is the thickness between the lowermost end of (e.g., the bottom of) the bending guide grooves 1414 and the second surface 1412, and T3 is the thickness between the first surface 1411 and the second surface 1412.

When T2 is greater than about three-quarters of T3, the depth of the bending guide grooves 1414 is not sufficient, such the function of the module vent 141 (e.g., bending in the direction in which the vent gas is ejected) may not occur.

When T2 is less than about half of T3, the strength of the bus bar holder 140 (e.g., the bus bar holder 140 having a weld line formed after injection of the module vent 141) may decrease due to a sharp thickness difference.

Accordingly, although the size of the vent hole 1413 is not large (e.g., is relatively small) before an event occurs in a battery cell 110, when an event occurs in the battery cell 110, some regions of the module vent 141 are removed (e.g., are torn) due to a high temperature and pressure of vent gas, and the remaining regions are widened in the direction of gas discharge due to high pressure during gas discharge, so that the size of the vent hole 1413 is increased to the same or similar level as the size of the cell vent 1192. Thus, the vent gas is discharged quickly. Therefore, according to embodiments of the present disclosure, a battery module in which the bus bar holder or the module vent may secure a component mounting space and delay heat propagation between cells.

While the foregoing embodiments have been described to practice the battery module according to the present disclosure, it should be understood that the embodiments described herein should be considered in a descriptive sense and not for purposes of limitation, and various changes in form and details may be made therein without departing from the spirit and scope of the disclosure as defined by the following claims and their equivalents.

What is claimed is:

1. A battery module comprising:
a battery cell having a cell vent; and
a bus bar holder on the battery cell and having a module vent, the module vent having a flat first surface, a flat second surface opposite to the first surface and facing the battery cell, a vent hole extending between the first and second surfaces and facing the cell vent, and a plurality of bending guide grooves in a partial region of the first surface spaced apart from the vent hole.

2. The battery module as claimed in claim 1, wherein a size of the vent hole is smaller than a size of the cell vent.

3. The battery module as claimed in claim 1, wherein the plurality of bending guide grooves form a square line shape in which the respective sides are spaced apart from each other.

4. The battery module as claimed in claim 1, wherein the module vent has a plurality of rupture guide grooves in a partial region of the second surface.

5. The battery module as claimed in claim 4, wherein the rupture guide grooves radially extend along a diagonal direction with respect to the vent hole.

6. The battery module as claimed in claim 4, wherein the bending guide grooves and the rupture guide grooves do not overlap each other.

7. The battery module as claimed in claim 4, wherein the module vent satisfies the following equation:

$$0.01 \text{ mm} \leq T1 \leq 0.5 \text{ mm}$$

wherein T1 is a depth of the rupture guide grooves.

8. The battery module as claimed in claim 1, wherein the module vent satisfies the following equations:

$$L2 \geq L1 \times 1/2 \text{ and } W2 \geq W1 \times 1/2$$

wherein L1 is a length of the cell vent, L2 is a length of the vent hole, W1 is a width of the cell vent, and W2 is a width of the vent hole.

9. The battery module as claimed in claim 1, wherein the module vent satisfies the following equation:

$$2.5 \leq L2/W2 \leq 2.8$$

wherein L2 is a length of the vent hole, and W2 is a width of the vent hole.

10. The battery module as claimed in claim 1, wherein the module vent satisfies the following equations:

$$L3 \leq L1 \text{ and } W3 \leq W1$$

wherein L1 is a length of the cell vent, L3 is a distance between major axes of the bending guide grooves, W1 is a width of the cell vent, and W3 is a distance between minor axes of the bending guide grooves.

11. The battery module as claimed in claim 1, wherein the module vent satisfies the following equation:

$$T3 \times 1/2 \leq T2 \leq T3 \times 3/4$$

wherein T2 is a thickness between a bottom of the bending guide grooves and the second surface, and T3 is a thickness between the first surface and the second surface.

12. A battery module comprising:
 a battery cell having a cell vent; and
 a bus bar holder on the battery cell and having a module vent, the module vent having a flat first surface, a flat second surface opposite to the first surface facing the battery cell, a vent hole extending between the first and second surfaces and facing the cell vent, and a plurality of rupture guide grooves in a partial region of the second surface.

13. The battery module as claimed in claim 12, wherein the rupture guide grooves are radially arranged around the vent hole and extend in diagonal directions with respect to the vent hole.

14. The battery module as claimed in claim 12, wherein the module vent has a plurality of bending guide grooves in a partial region of the first surface spaced apart from the vent hole.

15. The battery module as claimed in claim 14, wherein the plurality of bending guide grooves form a square line shape in which the respective sides are spaced apart from each other.

* * * * *